(12) United States Patent
Weiss

(10) Patent No.: US 6,284,164 B1
(45) Date of Patent: Sep. 4, 2001

(54) COTTON CANDY MACHINE

(75) Inventor: Ronald R. Weiss, Okeana, OH (US)

(73) Assignee: Gold Medal Products Company, Cincinnati, OH (US)

( * ) Notice: Subject to any disclaimer, the term of this patent is extended or adjusted under 35 U.S.C. 154(b) by 0 days.

(21) Appl. No.: 09/305,351

(22) Filed: May 3, 1999

Related U.S. Application Data

(63) Continuation-in-part of application No. 08/844,362, filed on Apr. 18, 1997, now abandoned.

(51) Int. Cl.$^7$ ............................................. A23G 7/00
(52) U.S. Cl. ........................................ 264/8; 425/8; 425/9
(58) Field of Search ........................... 264/8, 403; 425/8, 425/9, 174.8 R

(56) References Cited

U.S. PATENT DOCUMENTS

| | | | | |
|---|---|---|---|---|
| 1,489,342 | * | 4/1924 | Brent | 425/9 |
| 3,118,396 | * | 1/1964 | Brown et al. | 425/9 |
| 3,483,281 | | 12/1969 | Chisholm | 264/8 |
| 4,526,525 | * | 7/1985 | Oiso et al. | 425/9 |
| 4,872,821 | * | 10/1989 | Weiss | 425/9 |
| 5,066,430 | | 11/1991 | Matthews | 264/8 |
| 5,427,811 | * | 6/1995 | Fuisz et al. | 425/9 |
| 5,441,754 | | 8/1995 | Evans, Sr. | 426/483 |
| 5,445,769 | | 8/1995 | Rutkowski et al. | 264/8 |
| 5,460,498 | | 10/1995 | Steel et al. | 264/8 |
| 5,498,144 | | 3/1996 | Francis et al. | 425/9 |
| 5,511,961 | * | 4/1996 | Sulivan | 425/9 |

FOREIGN PATENT DOCUMENTS

979887 A1 * 2/2000 (EP) .

* cited by examiner

Primary Examiner—Nam Nguyen
Assistant Examiner—Thu Khanh T. Nguyen
(74) Attorney, Agent, or Firm—Wood, Herron & Evans, LLP

(57) ABSTRACT

An improved cotton candy machine melts sugar by inductively heating a spinning head and preferably a perforated spinner band on the spinner head. An induction heater is disposed in a machine base beneath the rotating spinner head and excites the band to a heat range for melting and spinning elongated molten strands of cotton candy from raw sugar. Electric heater strips, electric conduits, electric terminals, electric slip rings and electric spring-loaded brushes are all eliminated. Methods are disclosed.

4 Claims, 1 Drawing Sheet

COTTON CANDY MACHINE

CROSS REFERENCE

The present application is a continuation-in-part of U.S. Ser. No. 08/844,362, filed on Apr. 18, 1997, now abandoned, the disclosure of which is hereby incorporated herein in its entirety.

FIELD OF THE INVENTION

This invention relates to cotton candy machines and more particularly to improved apparatus for making cotton candy from sugar.

BACKGROUND OF THE INVENTION

In the past, a typical cotton candy machine was operable to heat sugar and to cast or spin molten sugar through centrifugal force in fiber or strand form into a tub where it was gathered on a stick or rolled paper tube for service and consumption. In order to carry out the heating and spinning function, such a typical cotton candy machine included a spinner head which defined a chamber for receiving raw sugar. Annular slotted bands surrounded the chamber and heater strips were disposed just inside the bands. The heater strips were connected to terminals which in turn were connected to annular electrical slip rings mounted for rotation with the spinner head. Electrical, spring-loaded brushes were mounted beneath the head for engaging the annular slip rings and conducting electricity to the heater strips as the head spun. The spinning head imparted a centrifugal force to raw sugar poured into the spinner head, forcing it outwardly against the heater strips. These melted the sugar before it was spun in strand form through the slotted bands. Preferably, the slotted bands were treated or coated for the purpose of electrically insulating them from the electrically energized heater strips. Such typical cotton candy machines are described in more detail in U.S. Pat. Nos. 3,036,532; 5,145,687; 5,441,754; 5,498,144 and 4,872,821, expressly incorporated herein for background detail.

While such machines have worked well for years, they include several inherent structures and functions which, if eliminated, could reduce costs and improve operation. For example, such machines require the use of heater strips, slip rings, brushes and springs, and electrical connectors or terminals, not to mention the expensively treated bands, all of which are subject to wear and replacement or require insulation, cost and assembly expense. Moreover, it is appreciated that since these past typical units required electricity to be conducted into the spinner head, care must be taken with insulation and protection of the electrical terminals and conduits to avoid short circuits, shock, or other hazards. If liquid or wet sugar was accidentally used in such a machine, an electrical problem or accident may result. While improvements in the construction and design of these elements over the years have been useful and significant, the presence of electrical service in the spinner head still requires and involves the foregoing concerns.

In other aspects of prior cotton candy machines, the heat generated by the heater strips is controlled by the application of electricity to them. Preferably, the heat is controlled in a range hot enough to melt the sugar but not so hot as to burn it. It is now desirable to provide an improvement in the way heat is applied to melt the sugar so the heat can be controlled more precisely and more quickly and responsively than through the direct application of electric current to the heater strips.

Accordingly, it has been one objective of this invention to provide an improved cotton candy machine.

A further objective of the invention has been to provide an improved spinner head for a cotton candy machine.

A further objective of the invention has been to eliminate the electrical terminals and interconnections in the spinner head of a cotton candy machine.

A further objective of the invention has been to eliminate all electrical service in the spinner head of a cotton candy machine.

A further objective of the invention is to provide more precise and responsive heat control to the spinner head of a cotton candy machine.

SUMMARY OF THE INVENTION

To these ends, an improved cotton candy machine according to a preferred embodiment of the invention comprises a cotton candy spinner head defining a chamber surrounded by slots or perforated bands but with no heater strips, electrical terminals, electrical conducts or slip rings, and with no spring-loaded electrical brushes mounted on the machine. Instead, the head is mounted on a shaft for rotation and an induction heater is disposed beneath the head for inductively heating components of the head to melt the sugar. Preferably, a candy accumulating tub surrounds the spinner head on top of the cabinet and has a tub bottom with an opening to permit an energy field to be directed from the induction heater toward the spinner head.

When energized, the induction heater causes the ferrous components of the head, including the spinner bands, to heat to a range where raw sugar, flung through the spinner chamber against the bands by centrifugal force, melts and is spun through narrow slots in the band into the tub as cotton candy, where it is collected for consumption as usual.

It will be appreciated that this invention provides numerous and significant advantages over the prior electrically operated machines and spinner heads. First, since no electricity is conducted into the head, the introduction of liquid or moist sugar will not cause any undesirable electrical occurrence, short circuit or other accident. Secondly, there are no heater strips or ribbons, and no electrical terminals or conduits in the spinner head to protect from raw, melted or partially melted sugar. Electrical insulation is not needed. Thirdly, the induction heater can be controlled to precisely and quickly adjust the temperature of the bands or other ferrous parts of the spinner head, giving the operation almost real time temperature control.

Fourthly, if any foreign non-ferrous item is accidently introduced into the spinner head or its chamber, it is not directly heated by the induction heater but simply remains in the chamber for removal when the machine is stopped. In addition, foreign objects in the head do not present an electrical or short hazard.

Fifthly, with the use of the induction heater, it is no longer necessary to use expensively coated or treated bands due to the circumstances that they do not need to be electrically insulated from any electrically charged heater strips.

BRIEF DESCRIPTION OF THE DRAWINGS

These and other objectives and advantages will become readily apparent from the following detailed description of a preferred embodiment of the invention, and from the drawings, in which.

DETAILED DESCRIPTION OF THE INVENTION

Figure 1:
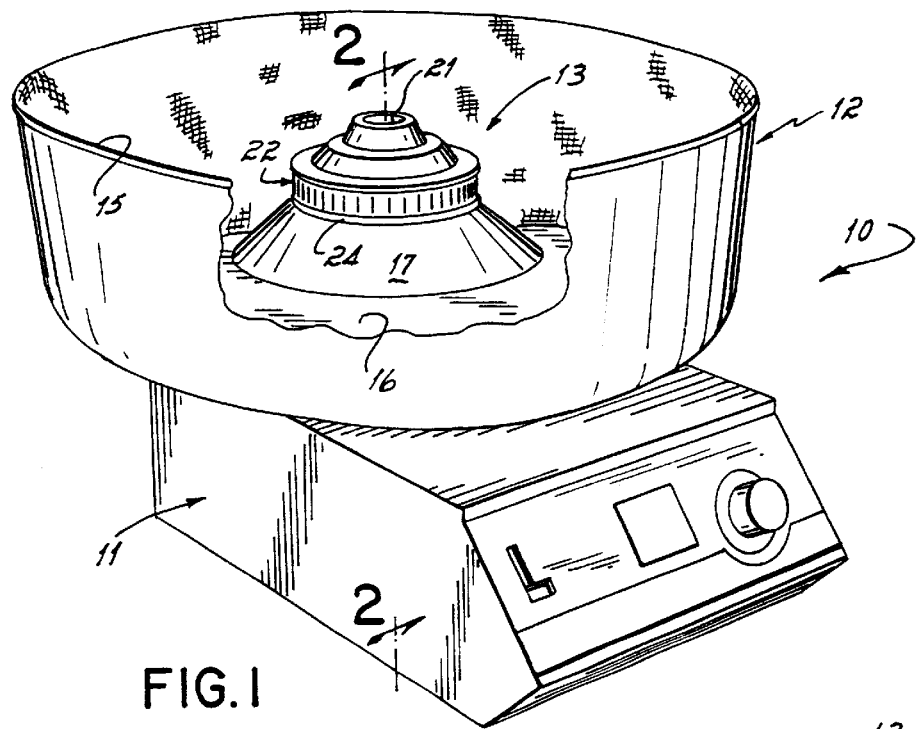
FIG. 1 is a perspective view of a cotton candy machine according to a preferred embodiment of the invention.

Turning now to the drawings, there is shown in FIG. 1 a cotton candy machine 10 according to the preferred embodiment of the invention. The machine includes a base 11, an accumulating tub 12 and a spinner head 13. In FIG. 1, a portion of the tub is cut away, as shown, so that the spinner head may be seen in its generally illustrative entirety. The tub has outer circumferential side walls 15 and a bottom wall 16 having a concave portion 17, as best seen in the cross-section of FIG. 2, extending up into the tub.

Figure 2:
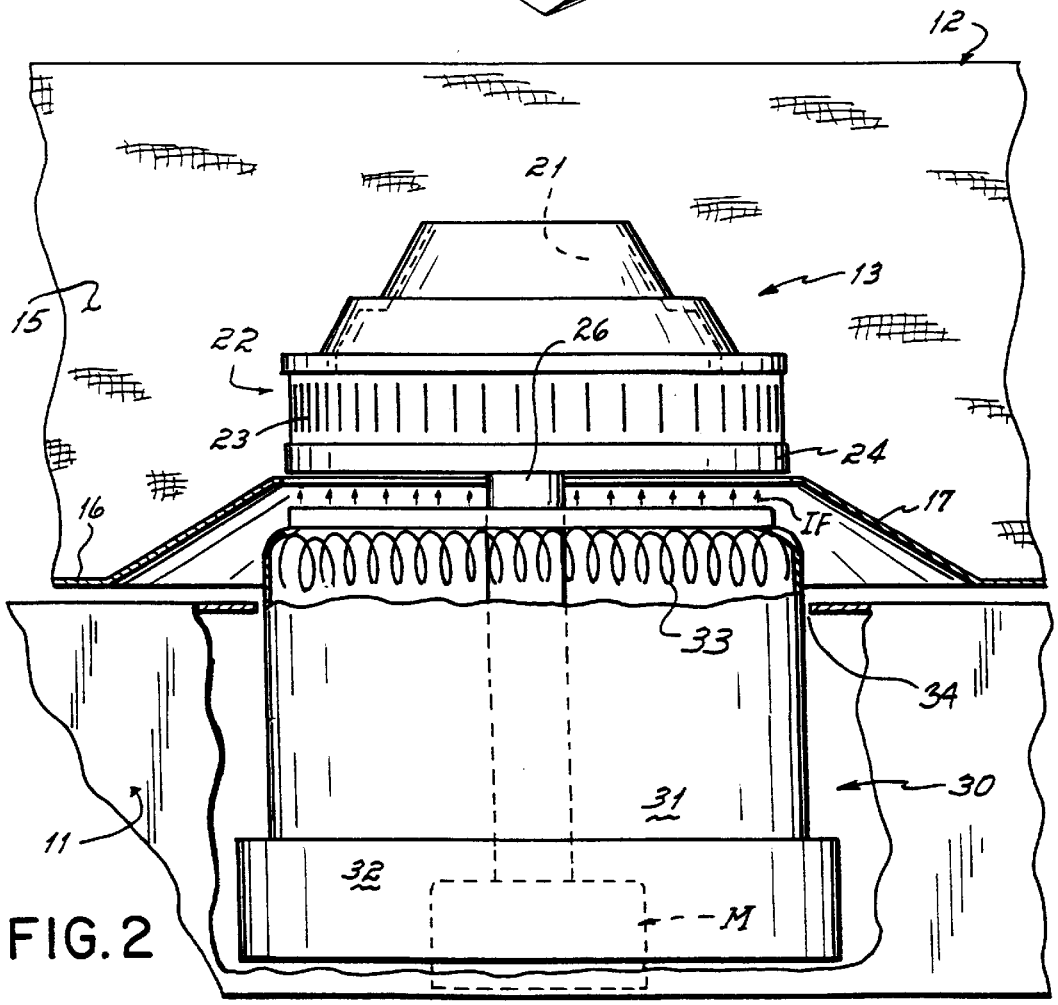
FIG. 2 is a cross-sectional view of the cotton candy machine taken generally in the direction of lines 2—2 of FIG. 1 and partially broken away to illustrate details for clarity.

The spinner head 13 has an internal chamber 21 and a circumferential annular spinner band 22 made of ferrous material. Preferably, spinner band 22 is perforated by narrow slots, such as illustrated at 23 in FIG. 2. The perforations in the spinner band may take any suitable form, for example, of narrow vertical slots 23, of narrow horizontal slots or of apertures of other shapes and dispersions throughout the band 22. While vertical slots 23 are shown in FIG. 2, inclined slots are useful and may be preferred, but any suitable configuration may be used in the invention. It is preferably that the openings, or perforations in the band, whether slots, holes or other forms, are small enough to prevent sugar granules being thrown out, but large enough to permit the flow or spinning of viscous molten sugar therethrough.

The chamber 21 extends throughout the spinner head as is defined in part by the spinner band 22 and the base member 24 just under the band 22.

A motor "M" is shown in the cut-away portion of the cabinet 11 of FIG. 2 and extending from the motor "M" is a shaft 26, which is attached at its upper end to the base 24 of the spinner head 13. When the motor is operated, the shaft 26 spins to rotate the spinner head 13. Suitable bearings are provided in the end bell of the motor, or in the base 11 of the cotton candy machine for supporting the rotating shaft 26 and supporting that shaft with the spinner head attached thereto for rotation.

Located within and extending at least partially above the base 11 is an induction heater 30, including a magnetic source or inductor 31 and a power supply, such as an electronic generator 32. Suitable controls for the motor, power supply and the inductor are mounted on the front of the base unit 11 as illustrated in FIG. 1. The induction heater 30 includes a magnetic coil 33 in an upper portion of the heater 30 which is located above an opening 34 formed in the top of base 11 and spaced closely below the base 24 of spinner head 13. When excited or energized electrically, the induction heater 30 creates an energy or induction field represented by the arrows "IF" in an area in which is located the spinner head 13 and, most preferably, the spinner band 22.

It will be appreciated that the spinner band 22 is preferably manufactured of ferrous material or, more specifically, material which will operably interact with the induction heater 30, such that when the induction heater 30 is turned on, the spinner band 22 will be excited in a manner that its temperature will be increased. Preferably, the temperature will be increased to a melt range somewhere in the area of 360 degrees Fahrenheit to about 500 degrees Fahrenheit and it will be appreciated that this range can be controlled by controlling the oscillation of the inductor 31 by means of the control of the power supply 32. This control will, in turn, control the amount of excitation of the spinner band 22 and thus its temperature.

This temperature should be hot enough to melt raw sugar contained within the spinner head so that it is melted, as it moves outwardly by centrifugal force, against the spinner band from within the spinner head 13 and is spun into elongated strands or fibers to form cotton candy for accumulation in the tub 12. In this regard, of course, it will be appreciated that the spinner head preferably rotates at approximately 3500 rpm, although this speed can be varied, depending on the result desired.

It will also be appreciated that the motor "M", utilized to spin the spinner head 12, may be shielded from the induction heater 30. Preferably a directional induction heater is utilized, so that the magnetic field is directed upwardly to the spinner head 13 and the spinner band 22 and not downwardly toward the motor "M". Any suitable form of induction heater and power supply might be utilized, preferably of the unidirectional type.

In use, it will be appreciated that sugar is poured into the top of the spinner head 13. The sugar may be colored and is preferably raw sugar of the type typically used in cotton candy machines, although any suitable form of raw sugar or cotton candy base could be used. It will also be appreciated that sugar can be poured into the spinner head 13 while it is either still or while it is moving.

Preferably, the sugar is poured in during continuous operation, for example, when the spinner head is rotating and when the induction heater 30 is energized to heat the spinner band 22, so that as sugar is poured into the spinner head, the centrifugal force of the spinning head urges the sugar outwardly in the lower part of the chamber 21 into the area just internally of the spinner band 22.

The sugar engages the spinner band, is melted and then exudes through the slots of the spinning band in the form of molten elongated strands or fibers, where the centrifugal force carries it outwardly toward the outer circumferential walls 15 of the tub 12 for collection on a stick, paper cone or the like, as is known.

It will be appreciated that the preferred embodiment as described above can be modified in numerous ways while still taking advantage of the induction heating process as described.

In particular, for example, the spinner head 13 can be modified to utilize two stacked spinner bands, for example, for a tri-color effect or for a high volume effect or for any other suitable purpose, all of which are generally disclosed in various ways in the aforementioned patents. In all of these modifications, of course, it would be unnecessary to utilize the prior electrically connected heater strips, any electric conduits or terminals, slip rings and the spring-loaded brushes mounted in the base for conveying electricity to the heads. None of such heads, according to the invention, whether in the preferred embodiment or as so modified, require specific electrical components and there is no electrical service in the heads.

As a result, should liquid be inadvertently poured into a head, or should more sugar be utilized, the liquid or moisture does not create an electrical problem or accident. Nor will any foreign object in the head be likely to cause a short or a shock.

Moreover, it is not necessary, for example, to protect any of the terminals or electrical conduits in the spinner head from the molten sugar, since there simply are no such terminals or conduits.

Furthermore, should some foreign object be dropped into the chamber 21, assuming it is non-ferrous, it itself is not excited by the induction heater 30; it simply remains there until the machine is stopped and it can be removed or retrieved. There is no likelihood of an electrical short generated by a foreign object within the chamber 21, since there is no electrical service to that chamber, nor any electrical components therein.

Moreover, it will also be appreciated that the heat applied to the sugar can be more precisely and quickly controlled by use of the induction heater 30 than in the previous direct current heater strip devices. In this regard, it will be appreciated, as noted above, that the heat-generating power is produced by the oscillation of the induction heater 30. Those oscillations can be increased or reduced to quickly and responsively increase or reduce the heat temperature of the spinner bands 22 or the other ferrous components of the spinner head 13 to thereby quickly and responsively change the temperature applied to the sugar. Thus the process can be varied as desired in a manner which is more quickly performed than in the prior electrically-operated spinner heads.

Moreover, it will also be appreciated that it is not necessary to utilize the relatively expensive spinner bands which are utilized in the prior machines. As noted above, these include specifically coated or treated bands which are relatively expensive as compared to simple uncoated or untreated bands made of ferrous material.

The ability to eliminate the use of expensive coated or treated bands is provided by the circumstance that no electricity is conducted into any heater strips and no electrical band insulation is necessary.

It will also be appreciated that for particular uses, different ferrous materials of different shapes and mass could be utilized in the spinner head and any preliminary or internal heating strip. These additional members can be designed to provide specific heating or flow performance characteristics as desired. Such additional ferrous members, however, are not required, the spinner band 22 itself being sufficiently operable to melt the sugar for the formation of cotton candy.

It will also be appreciated that the position of the induction heater could be changed as desired and, while the current position of the induction heater as shown is currently preferred, that induction heater could be located in other dispositions relative to the spinner head to accomplish the same purpose of heating the head for melting the sugar to produce cotton candy.

Accordingly, the invention contemplates an improved cotton candy machine having an improved spinner head which eliminates numerous electrical components utilized in past and prior machines, all to the advantage of eliminating direct electrical service to the spinner head itself, as noted above.

These and other advantages and modifications will become readily apparent to those of ordinary skill in the art without departing from the scope of the invention, and applicant intends to be bound only by the claims appended hereto.

What is claimed is:

1. A cotton candy machine comprising:

a base;

an accumulating tub mounted above said base, said tub having a bottom wall, side walls extending upwardly from the bottom wall, and an opening formed in the bottom wall;

a spinner head for heating and spinning cotton candy from sugar and being mounted for rotation within said tub;

a perforated spinner band of ferrous material mounted for rotation with said spinner head within said tub; and an induction heater oriented to direct an energy field toward said spinner head through the opening in said tub for heating said spinner band to melt said sugar in said head so it can be spun out as molten strands to form cotton candy.

2. Apparatus as in claim 1 wherein said accumulating tub has a bottom disposed between said spinner head and said machine base.

3. A cotton candy machine comprising:

a base;

an accumulating tub mounted above said base, said tub having a bottom wall including a concave portion extending up into said tub, side walls extending upwardly from the bottom wall, and an opening formed in the bottom wall;

a spinner head for heating and spinning cotton candy from sugar and being mounted for rotation within said tub;

a perforated spinner band of ferrous material mounted for rotation with said spinner head within said tub; and an induction heater aligned with the opening in said tub, and operable to direct an energy field toward said spinner head through the opening for heating said spinner band to melt said sugar in said head so it can be spun out as molten strands to form cotton candy.

4. A method of producing cotton candy including the steps of:

providing a base;

providing an accumulating tub above said base, said tub having a bottom wall, side walls extending upwardly from the bottom wall, and an opening formed in the bottom wall;

rotating a cotton candy spinner head within said tub;

energizing an induction heater and aligning said induction heater with the opening in said tub to direct an energy field toward said spinner head through the opening in said tub and heat a portion of said spinner head for melting sugar in said head; and spinning molten cotton candy from said head for accumulation in said tub.

* * * * *